United States Patent [19]

Matsuoka

[11] Patent Number: 5,010,861
[45] Date of Patent: Apr. 30, 1991

[54] HEAT-INSULATING STRUCTURE OF SWIRL CHAMBER AND PRODUCTION METHOD THEREOF

[75] Inventor: Hiroshi Matsuoka, Yamato, Japan

[73] Assignee: Isuzu Motors Limited, Tokyo, Japan

[21] Appl. No.: 558,544

[22] Filed: Jul. 27, 1990

[30] Foreign Application Priority Data

Aug. 10, 1989 [JP] Japan .................................. 1-205644

[51] Int. Cl.$^5$ .......................... F02B 19/08; F02B 19/16
[52] U.S. Cl. .................................... 123/271; 123/254;
29/888.061
[58] Field of Search ............... 123/254, 269, 270, 271,
123/668, 669; 29/888.06, 888.061

[56] References Cited

U.S. PATENT DOCUMENTS

| | | | |
|---|---|---|---|
| 4,616,611 | 10/1986 | Ogawa et al. | 123/270 |
| 4,676,207 | 6/1987 | Kawamura et al. | 123/271 |
| 4,681,074 | 7/1987 | Ogawa et al. | 123/271 |
| 4,699,102 | 10/1987 | Taniguchi | 123/271 |
| 4,834,042 | 5/1989 | Wakasa et al. | 123/271 |
| 4,844,037 | 7/1989 | Miyakawa et al. | 123/270 |
| 4,875,939 | 10/1989 | Miyakawa et al. | 123/271 |

FOREIGN PATENT DOCUMENTS

| | | | |
|---|---|---|---|
| 0188024 | 10/1984 | Japan | 123/271 |
| 0030421 | 2/1985 | Japan | 123/270 |
| 61-83451 | 4/1986 | Japan . | |
| 62-67219 | 3/1987 | Japan . | |

Primary Examiner—Willis R. Wolfe
Attorney, Agent, or Firm—Browdy and Neimark

[57] ABSTRACT

In a heat-insulating structure of a swirl chamber in accordance with the present invention, a cast metal blocks made of a metal material casted into the gap portions in molded articles made of a ceramic fiber-reinforced material are disposed outside swirl chamber blocks made of a ceramic material and forming swirl chambers, and the cast metal blocks are fitted and fixed to a fitting holes of a cylinder head in such a manner as to define air layers. The coefficient of thermal expansion and heat transfer rate of the cast metal blocks can be controlled and heat-resistance can be improved by adding the ceramic fiber-reinforced material to the cast metal blocks. Furthermore, the present invention relates to a production method of a heat-insulating structure of a swirl chamber which imparts easily a residual compressive stress to the swirl chamber blocks using the cast metal blocks.

14 Claims, 4 Drawing Sheets

HEAT-INSULATING STRUCTURE OF SWIRL CHAMBER AND PRODUCTION METHOD THEREOF

BACKGROUND OF THE INVENTION

1. Field of the Invention

This invention relates to a heat-insulating structure of a swirl chamber in an internal combustion engine and its production method.

2. Description of the Prior Art

Generally, in combustion chambers of a swirl chamber type in an internal combustion engine, mixing of a fuel and air is made twice each in swirl chamber and main combustion chamber and the mixing state is better than in those of a direct injection type. However, the loss of cooling water is greater and the fuel efficiency becomes lower. Therefore, attempts have been made to constitute the swirl chamber in a heat-insulating structure in order to minimize the loss of cooling water. However, if the structure is constituted in such a structure as to thermally insulate the outer surface of each swirl chamber uniformly, durability problem with swirl chambers resulting from the difference of thermal stresses arises.

If the ceramic material constituting each swirl chamber block is silicon nitride ($Si_3N_4$), silicon carbide (SiC), or the like, the ceramic material such as silicon nitride ($Si_3N_4$), silicon carbide (SiC), or the like, has high heat resistance and can withstand a high temperature and high strength, but has high heat transfer rate and a low heat-insulating property. Since the ceramic material has high Young's modulus and high deformation resistance, a high thermal stress acts on it if any non-uniformity occurs in its temperature distribution.

Further, the temperature distribution of the inner wall surface constituting each swirl chamber is such that the jet port portion for communicating the main combustion chamber with the swirl chamber reaches a high temperature and moreover, the temperature distribution around the jet port portion is such that the jet port portion on the center side of the main combustion chamber reaches particularly a high temperature. Therefore, if each swirl chamber block constituting the inner wall portion of the swirl chamber is made of a ceramic material, the temperature distributions at the jet port portion of the swirl chamber block become considerably nonuniform and the thermal stress therefore acts and exerts adverse influences on the strength of the ceramic material, causing thereby the problem of durability. Accordingly, a problem remains to be solved as to how each swirl chamber itself be constituted in order to improve durability of the swirl chamber block.

Conventionally, the swirl chamber of an engine is disclosed, for example, in Japanese Patent Laid-Open No. 67219/1987. The swirl chamber of the engine disclosed in this reference is equipped with swirl chamber constituent member for forming the swirl chamber and a metallic cylinder member fitted to the outer peripheral portion of the swirl chamber constituent member, and the cylinder member is composed of a martensite type heat-resistant steel having the composition consisting of 0.13 to 0.45 wt % of C, 0.3 to 2.5 wt % of Si, 0.5 to 1.0 wt % of Mn, 10.0 to 13.0 wt % of Cr, 0.3 to 1.3 wt % of Mo and the balance consisting substantially of iron, and converted substantially to a martensite texture. After this cylinder member is shrinkage-fitted to the swirl chamber constituent member, it is then converted to the sorbite structure by tempering.

However, in the swirl chamber of the engine described above, the cylinder member is shrinkage-fitted to the swirl chamber constituent member and then converted to the sorbite structure by tempering. Accordingly, a sufficient residual compressive stress cannot be imparted to the swirl chamber constituent member by the cylinder member and when the swirl chamber constituent member is made of a ceramic material, it cannot withstand the thermal stress resulting from non-uniformity of the temperature distribution. The method of imparting the residual compressive stress to the ceramic material by shrinkage fit of the metallic material to the ceramic material cannot impart effective residual compressive stress to the ceramic material because the imparting direction of the compressive force is unidirectional.

The production method of the swirl chamber of the engine is disclosed, for example, in Japanese Patent Laid-Open No. 83451/1986. The production method of the swirl chamber of the engine disclosed in this reference comprises as follows. When the swirl chamber of the engine is produced by fitting an outer cylinder of an iron type sintered material, that is compression powder molded or is preparatively sintered, to a ceramic inner cylinder, this method comprises the steps of integrating ceramic particles by a copper type bonding material, preparing an insert member molded in the shape substantially equal to the shape of the heat-insulating chamber to be formed at a predetermined position between the inner and outer cylinders, interposing the insert member at the predetermined position between the inner and outer cylinders and subjecting it to the regular sintering step.

In accordance with the production method of the swirl chamber of the engine described above, however, the outer peripheral metal material consists of the sintered member and the sintered metal has the function of only sealing the heat-insulating layer but cannot control the compressive force to the ceramic inner cylinder and cannot either control the coefficient of thermal expansion and thermal transfer rate of the outer cylinder. Therefore, this prior art reference does not have the technical concept of improving durability of the ceramic inner cylinder.

Furthermore, when the block that constitutes the swirl chamber is directly casted into a large-scale component such as the cylinder head, deviation of dimension becomes excessive at the time of casting and the resulting product cannot be used as an approved product. The deviation of the casting dimension is about ±1.5 mm for the size of about 500 mm, for example, but accuracy of the position dimension of the swirl chamber must be about ±0.2 mm.

SUMMARY OF THE INVENTION

It is a main object of the present invention to solve the problems described above and to provide a heat-insulating structure of a swirl chamber. In other words, in an internal combustion engine including a cylinder block having formed therein cylinders, a cylinder head fixed to the cylinder block and equipped with hole portions formed in such a manner as to correspond to the cylinders for forming swirl chambers, and main combustion chambers formed inside the cylinders of the cylinder block, the present invention is directed to provide a heat-insulating structure of a swirl chamber which comprises swirl chamber blocks having formed therein the swirl chambers and jet ports establishing communication between the swirl chambers and the main combustion chambers, and made of a ceramic material; and cast metal blocks formed by casting a metal material into gaps in molded articles made of a fiber-reinforced material and disposed outside each of the swirl chamber blocks, the cast metal blocks being fixed to the hole portions formed in the cylinder head.

It is another object of the present invention to provide a heat-insulating structure of a swirl chamber which forms the swirl chamber block of each swirl chamber, which is exposed to a combustion gas, by a ceramic material having high heat-resistance, high strength and high thermal shock resistance such as silicon nitride, aluminum titanate, or the like, so as to form the structure capable of withstanding the high temperature combustion gas; disposes particularly a metal material onto the outer surface of each swirl chamber block by casting the metal material so as to impart a residual compressive stress to the swirl chamber block by the cast metal block while controlling the compressive force and thus to secure strength; buries a fiber-reinforced material in the cast metal block; and can control the coefficient of thermal expansion and thermal transfer rate of the cast metal block by adjusting the kind and amount of the fiber-reinforced material.

It is still another object of the present invention to provide a heat-insulating structure of a swirl chamber which can control the strength and temperature of jet port formation portion of each swirl chamber of the heat-insulating structure in consideration of the fact that the jet port portion of the swirl chamber should meet severer strength requirements caused by thermal stress and mechanical stress; controls the temperature distribution of each swirl chamber block uniformly by optimally setting the contact portion and contact area between the cast metal block and the cylinder head; mitigates heat accumulation by allowing vigorous thermal radiation at the portions which become the high temperature regions, such as the jet port portion of the swirl chamber; makes the temperature distribution uniform not only at the entire peripheral portion of the jet port portion of the swirl chamber block but also throughput the swirl chamber block as a whole; and prevents the occurrence of the thermal stress to the swirl chamber block and improves the strength of the swirl chamber block itself and hence, its durability.

According to the heat-insulating structure of the swirl chamber described above, the residual compressive stress is imparted by the cast metal block to the swirl chamber block made of the ceramic material having high temperature resistance and high strength to secure the strength of the swirl chamber block, and to prevent the occurrence of damage to the swirl chamber block. Thus, durability of the swirl chamber can be improved. Moreover, the residual compressive stress to be imparted to the swirl chamber block can be controlled entirely, locally and freely by selecting the thickness of the cast metal block and the contact portion with the swirl chamber block to the optimum conditions. Particularly, the cast metal block is made of the fiber-reinforced metal, and the coefficient of thermal expansion and thermal transfer rate of the cast metal block can be controlled freely by optimally selecting the content or material of the fiber-reinforced material in the cast metal block, with material selected from ceramic whiskers or ceramic fibers made of silicon nitride ($Si_3N_4$), silicon carbide (SiC), aluminum oxide, composite materials, and the like, or from stainless steel fibers.

In this heat-insulating structure of the swirl chamber, it is possible to increase the thickness of the jet port formation portion of the swirl chamber block, at which the requirement for strength is the severest, and to secure sufficiently the strength of the jet port formation portion.

Furthermore, the excellent heat-insulating degree can be secured by optimally selecting the thickness of the swirl chamber block made of the ceramic material and by selecting also the thickness of the air layer between the cast metal block and the cylinder head, and moreover, the thermal energy quantity of the swirl chamber block which is radiated thermally to the cylinder head can be controlled by selecting the contact area or contact portion between the cast metal block and the cylinder head. Particularly, over-heat of the jet port formation portion can be prevented by mitigating its heat accumulation and the temperature distribution can be made uniform not only at the entire peripheral portion of the jet port portion of the swirl chamber block but also throughout the entire swirl chamber block. In this manner, durability can be improved by reducing the occurrence of the thermal stress to the swirl chamber block.

It is an additional object of the present invention to provide a heat-insulating structure of a swirl chamber in which a heat-insulating layer is interposed between each swirl chamber block and each cast metal block and can easily obtain the most preferably heat-insulating degree for the swirl chamber by selecting the thickness and material of this heat-insulating layer.

It is still another object of the present invention to provide a production method of a heat-insulating structure of a swirl chamber which comprises the steps of forming each swirl chamber block for constituting each swirl chamber communicating with each main combustion chamber through a jet port from a ceramic material; assembling a molded article made of a fiber-reinforced material outside each swirl chamber block; forming a cast metal block by casting a metal material into the gaps in the molded articles; and casting the cast metal block into a hole portion of a cylinder head while forming an air layer.

The production method of a heat-insulating structure of a swirl chamber described above can easily obtain the heat-insulating structure of a swirl chamber through each of the steps described above, can reduce deviation of dimensional accuracy at the production steps, can improve reliability of quality of the product, can prevent the excessive deviation of the dimension at the time of casing unlike the direct casting of the block constituting the swirl chamber into a large-scale member such as the cylinder head as has been made in the prior art technique because the individual heat-insulating structure of the swirl chamber is first produced and is then assembled into the cylinder head, can thus produce the heat-insulating structure of the swirl chamber having high reliability as the product, can easily impart the compressive force to the swirl chamber block made of the ceramic material by particularly casting the cast metal block, can prevent the occurrence of the swirl chamber block such as cracks and breakage while securing the strength of the swirl chamber block and can thus improve durability of the swirl chamber.

In the production method of the heat-insulating structure of the swirl chamber described above, the thermal transfer rate and coefficient of thermal expansion of the cast metal block can be controlled to the optimum state by adjusting the materials and content of the fiber-reinforced material in the cast metal block, heat-resistance of the swirl chamber can be improved and the occurrence of the thermal stress can be reduced by making uniform the temperature distribution of the swirl chamber block.

DETAILED DESCRIPTION OF THE EMBODIMENTS

Hereinafter, preferred embodiments of the heat-insulating structure of a swirl chamber in accordance with the present invention will be explained in detail with reference to the accompanying drawings.

Figure 1:
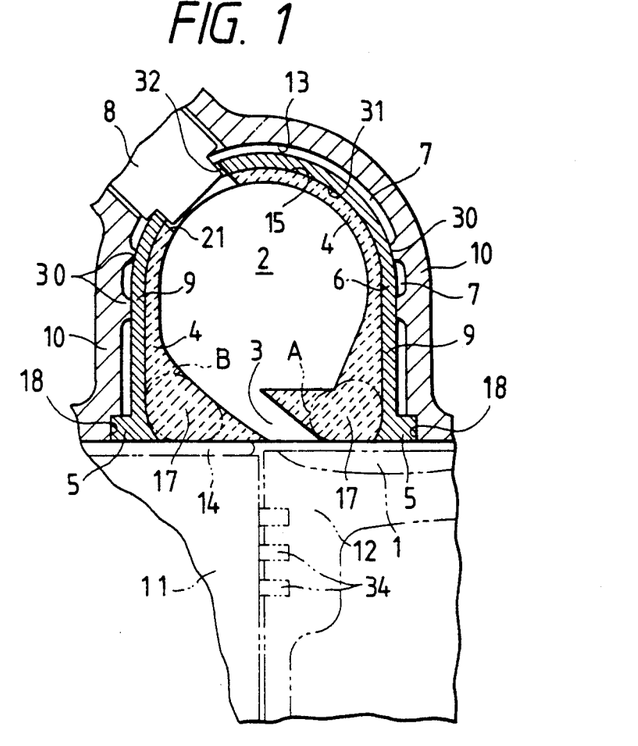
FIG. 1 is a sectional view showing an embodiment of a heat-insulating structure of a swirl chamber in accordance with one embodiment of the present invention.

FIG. 1 is a sectional view showing the heat-insulating structure of a swirl chamber in accordance with one embodiment of the present invention.

The internal combustion engine incorporating the heat-insulating structure of the swirl chamber includes primarily a cylinder block 11 in which cylinders are formed, a cylinder head 10 fixed to the cylinder blocks 11 and equipped with hole portions 13 for forming the swirl chambers 2 and corresponding to the cylinders and main combustion chambers 1 formed inside the cylinders of the cylinder block 11. More particularly, the cylinder head 10 is fixed to the cylinder block 11 through a head gasket 14. A cylinder liner (not shown in the drawing) for constituting each cylinder is fitted to each hole portion formed inside the cylinder block 11. These hole portions 13 are formed in the cylinder head 13 in the number corresponding to the number of cylinders of the engine. Cast metal blocks 6 are fitted to the hole portions 13 formed in the cylinder head 10 in such a manner as to define an air layer 7 and the flange portion 5 of each cast metal block 6 is pushed and fixed into the inlet portion 18 of each hole portion 13. A fuel injection nozzle 8 for atomizing a fuel into the swirl chamber 2 is disposed in each swirl chamber 2 and at times, a glow plug (not shown in the drawing) for igniting the atomized fuel is disposed, too.

Though not shown in the drawing, intake/exhaust ports are formed in the cylinder head 10 and intake/exhaust valves for opening and closing them are disposed. A piston 12 having fitted thereto a piston ring 34 is fitted into each cylinder liner which is fitted to the hole portion formed in the cylinder block 11, in such a manner as to be capable of reciprocation.

The heat-insulating structure of the swirl chamber in accordance with the present invention comprises mainly the swirl chamber blocks 4 which form the swirl chambers 2 and are equipped with the jet ports 3 for communicating the swirl chambers 2 with the main combustion chambers 1, the cast metal blocks 6 disposed outside the swirl chamber blocks 4 by casting and the cylinder head 10 positioned outside the cast metal blocks 6 while defining the air layer 7. The swirl chamber block 4 forming each swirl chamber 2 is made of a ceramic material such as silicon nitride ($Si_3N_4$), silicon carbide (SiC), aluminum titanate, a composite material, and the like. In this swirl chamber block 4, its thickness of the portion around each jet port 3, that is, the het port formation portion 17 of the jet port 3, is greater than the thickness of the other portions so as to be capable of withstanding higher temperature and to increase heat-resistance as well as strength.

The cast metal block 6 casted to the outer surface 15 of each swirl chamber block 4 is made of a metal material such as aluminum (Al), cast iron (Fc) or Niresist into which a molded article 9 made of a ceramic material is buried, or in other words, a fiber-reinforced metal (FRM). The molded article 9 is molded from ceramic whiskers or ceramic fibers made of a ceramic material such as silicon nitride ($Si_3N_4$), silicon carbide (SiC), aluminum oxide ($Al_2O_3$), or the like, or fibers consisting of stainless steel. The cast metal block 6 is equipped with the flange portion 5 at the portion constituting the head lower surface portion.

In this heat-insulating structure of the swirl chamber, the jet port formation portion 17 of each swirl chamber block, at which the jet port 3 is formed, is the portion which is exposed to a higher temperature than the other portions and on which severer requirements for thermal strength are imposed. Of the jet port formation portion 17 of the swirl chamber block 4 where the jet port 3 is formed, the portion A positioned on the center side of the main combustion chamber 1 receives severer thermal influences than the portion B spaced apart from the main combustion chamber 1 and more excessive compressive force acts on the portion A locally.

Therefore, in the heat-insulating structure of the swirl chamber, the swirl chamber block 4 is made of a ceramic material having high temperature resistance and high strength so as to improve its heat resistance, the molded article 9 made of the ceramic material is assembled outside the swirl chamber block 4 constituting the swirl chamber 2, the metal material such as aluminum, cast iron, etc., is casted into the molded article 9 so as to dispose the cast metal block 6, the thickness and material of the cast metal block 6 are set or controlled to the optimum condition in order to control the residual compressive stress occurring in the swirl chamber block 4 and the material and content of the molded article 9 are set or controlled to the optimum condition so that the heat expansion coefficient and heat transfer rate of the cast metal block can be controlled or selected to the optimum condition.

Furthermore, in this heat-insulating structure of the swirl chamber, the heat-insulating degree of the swirl chamber block 4 is controlled by setting or controlling the contact area and contact region between the flange portion 5 of the cast metal block 6 and the inlet portion 18 of the hole portion 13 of the cylinder head 10. Therefore, in this heat-insulating structure of the swirl chamber, heat accumulation is reduced by bringing the jet port formation portion 17 of the swirl chamber block 4 into contact with the cast metal block 6 and the heat-insulating degree is much more reduced than at the other portions. In this manner the heat energy occurring in the swirl chamber block 4 is thermally radiated from the jet port formation portion 17 to the cylinder head 10 so as to prevent the excessive rise of the temperature at the jet port formation portion 17 of the swirl chamber block 4 and to reduce the temperature difference between the jet port formation portion 17 of the swirl chamber block 4 and the other portions. Thus, the swirl chamber block 4 can be controlled as a whole to have a uniform temperature distribution. Furthermore, the heat energy which is thermally radiated to the cylinder head 10 can be controlled by setting the contact area and contact region between the flange portion 5 of the cast metal block 6 outside the swirl chamber block 4 and the fitting hole or the inlet portion 18 to the optimum condition and the temperature distribution of the swirl chamber block 4 made of the ceramic material can be controlled to the optimum state.

Projections 30 which come into contact with the outer surface of the cast metal block 6 are formed in the hole portions 13 of the cylinder head 10. These projections 30 may be formed either in the cylinder head 10 or the cast metal block 6. Since the cast metal block 6 and the cylinder head 10 come into mutual contact through the projections 30, the heat flow that flows from the cast metal block 6 to the cylinder head 10 can be controlled. Moreover, since the contact area and contact portions between the cast metal block 6 and the cylinder head 10 can be controlled by the positions of disposition of the projections 30, size, their number and their contact areas, the heat energy that is thermally radiated from the cast metal block to the cylinder head 10 can be controlled to the optimum state by the selected conditions of these projections 30.

The heat-insulating structure of the swirl chamber in accordance with the present invention can be produced in the following way, for example. Namely, the heat-insulating structure of the swirl chamber can be produced by the production method which comprises mainly the steps of forming each swirl chamber block 4 for forming the swirl chamber 2 communicating with the main combustion chamber 1 through the jet port 3 by the ceramic material; assembling the molded article 9 made of the fiber-reinforced material such as ceramic whiskers, ceramic fiber, etc. to the outer surface 15 of the swirl chamber block 4; forming the cast metal block 6 by casting the metal material such as aluminum or the like into the gap formed in the molded article 9; and assembling the cast metal block 6 into the fitting hole 13 formed in the cylinder head 10 through the air layer 7.

Figure 2:
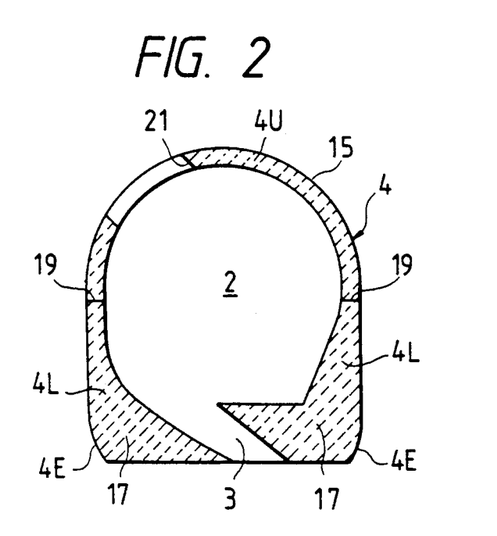
FIG. 2 is a sectional view showing an example of a swirl chamber block to be assembled into the heat-insulating structure of a swirl chamber shown in FIG. 1.
Figure 3:
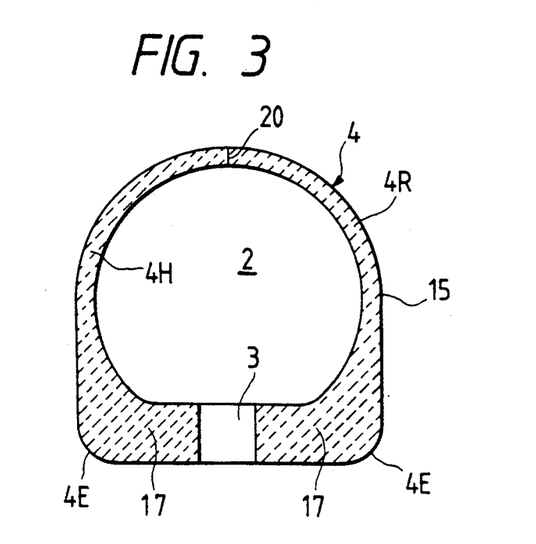
FIG. 3 is a sectional view showing another example of the swirl chamber block to be assembled in the heat-insulating structure of a swirl chamber shown in FIG. 1.
Figure 4:
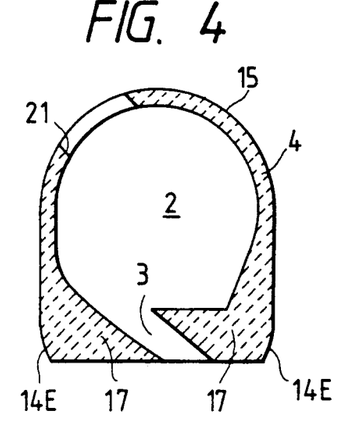
FIG. 4 is a sectional view showing an example of the swirl chamber block in the heat-insulating structure of a swirl chamber shown in FIG. 1.

More definitely, the production method of the heat-insulating structure of the swirl chamber comprises each of the following steps. Each swirl chamber block 4 in this heat-insulating structure of the swirl chamber is made of a ceramic material which is highly resistant to thermal shock, such as silicon nitride ($Si_3N_4$), silicon carbide ($SiC$), aluminum titanate, composite materials, and the like. First of all, as to the production of the swirl chamber block 4, it can be molded in a unitary structure in the shape of the swirl chamber block 4 and the molded article is then sintered. Alternatively, it can be produced by dividing the swirl chamber block 4 into upper and lower swirl chamber blocks 4U and 4L as shown in FIG. 2, molding and sintering them and thereafter coupling them together at the bond portion 19 by chemical vapor deposition, or the like. Still alternatively, it can be produced by dividing the swirl chamber block 4 into right and left swirl chamber blocks 4R and 4H as shown in FIG. 3, molding and sintering them and thereafter coupling them together at the bond portion 20 by chemical vapor deposition, or the like. The swirl chamber block 4 can be produced in the manner as described above. As to the shape of the outer peripheral surface 4E of the jet port formation portion 17 of the swirl chamber block 4, it may be formed in the straight form but more preferably, it is shaped in the tapered form with a somewhat reduced diameter as shown in the drawing. If the shape of the outer peripheral surface 4E of the jet port formation portion 17 of the swirl chamber block 4 is shaped in the tapered form, the contact area of the cast metal block 6 with the swirl chamber block 4 becomes great and the residual compressive stress generated is imparted effectively to the swirl chamber block 4. Next, machining is applied to the necessary portions of the swirl chamber block 4 produced through the steps described above and finish machining is made to the final shape of the swirl chamber block 4 as shown in FIG. 4.

Figure 5:
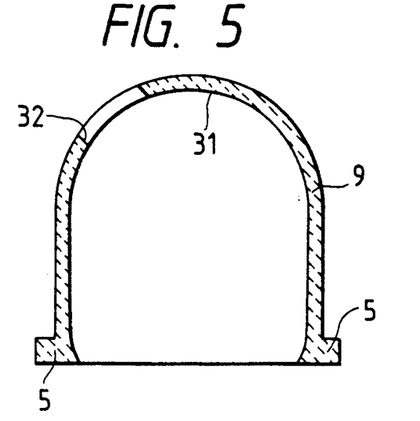
FIG. 5 is a sectional view showing a molded article in the heat-insulating structure of a swirl chamber shown in FIG. 1.
Figure 6:
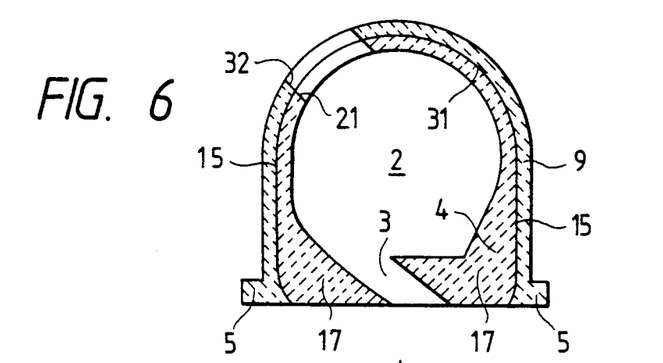
FIG. 6 is a sectional view showing the state where the molded article shown in FIG. 5 is assembled into the swirl chamber block shown in FIG. 4.

Next, the molded article 9 is produced by molding ceramic whiskers or ceramic fibers made of the ceramic material such as silicon nitride ($Si_3N_4$), silicon carbide ($SiC$), aluminum oxide ($Al_2O_3$), composite materials, or the like, or fibers made of stainless steel, into the predetermined shape as shown in FIG. 5. Accordingly, the molded article 9 has the structure wherein a large number of voids or gaps between the fibers are formed. The flange portion 5 is disposed at the portion of the molded article 9 which constitutes the head lower surface portion. Next, as shown in FIG. 6, the swirl chamber block 4 and the molded article 9 are assembled with the outer surface 15 of the former fitting to the inner surface 31 of the latter.

Figure 7:
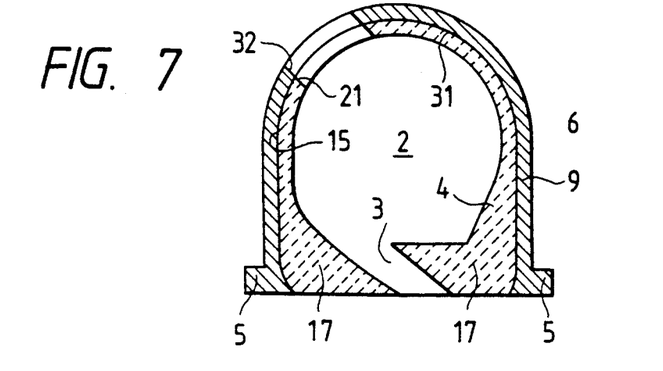
FIG. 7 is a sectional view showing the state where a metal material is casted into the molded article assembled into the swirl chamber block shown in FIG. 6 to form a cast metal block.
Figure 8:
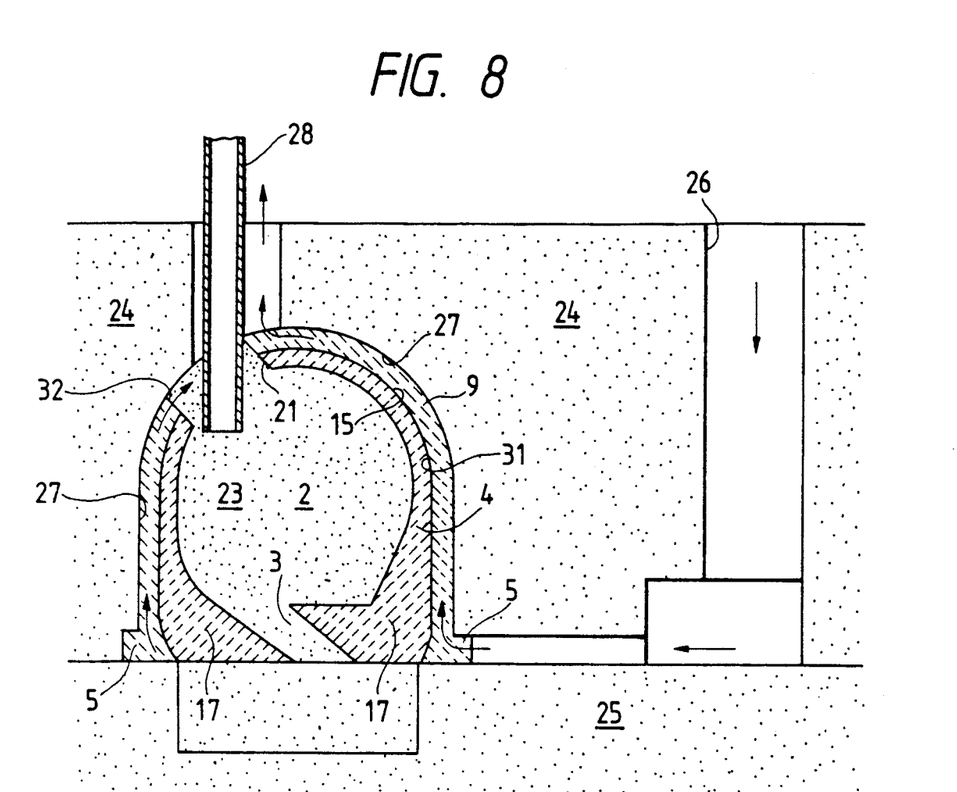
FIG. 8 is an explanatory view showing a casting mold which is useful for explaining the casting method of the metal material into the swirl chamber block of the heat-insulating structure of a swirl chamber shown in FIG. 1.

The molded article 9 assembled into the swirl chamber block 4 is then set to the casting mold as shown in FIG. 8. In this case, casting sand 23 is packed into the swirl chamber 2 in the swirl chamber block 4, the jet port 3, the fitting hole 21 of the fuel injection nozzle 8 and the fitting hole 32 of the fuel injection nozzle 8 in the molded article 9 and at times, into the portion forming each fitting hole of the glow plug. The swirl chamber block 4 and the molded article 9, into which the casting sand 23 is thus packed, are placed into casting molds 24, 25 such as sand molds having the cavity 27 in the shape corresponding to their outer shapes. A gas vent pipe 28 is provided to vent gas generated from the casting sand 23 packed in the swirl chamber block. After the molded article 9 and the swirl chamber block 4 are disposed in the casting molds 24, 25, the molten metal of aluminum (Al), cast iron (Fc) or Niresist is poured via the gate 26 into a large number of gaps and voids formed in the molded article 9 placed at the cavity 27 of the casting molds 24, 25 so as to fill the gaps and voids. After the molten metal for constituting the cast metal block 6 is cooled and solidified, the swirl chamber block 4 into which the cast metal block 6 is casted is taken out from the casting molds 24, 25 and the cast metal block 6 is machined to its final shape. In other words, the heat-insulating structure of the swirl chamber under the state where the fiber-reinforced metal (FRM) is casted to the outside of the swirl chamber block 4 is complete (see FIG. 7). Finally, the cast metal block 6 is fitted into the hole portion 13 formed in the cylinder head 10, and the cast metal block 6 is fixed to the cylinder head 10 by pushing the flange portion 5 of the cast metal block 6 into the inlet portion 18 of the hole portion 13 of the cylinder head 10.

Figure 10:
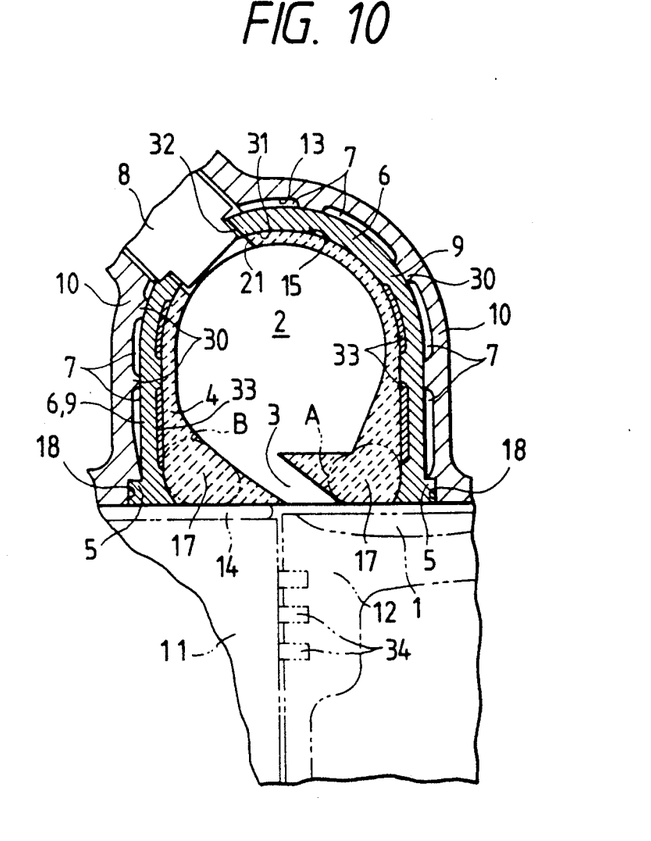
FIG. 10 is a sectional view showing the heat-insulating structure of a swirl chamber in accordance with another embodiment of the present invention.

FIG. 10 shows the heat-insulating structure of the swirl chamber in accordance with another embodiment of the present invention. In comparison with the heat-insulating structure of the swirl chamber shown in FIG. 1, this heat-insulating structure of the swirl chamber has exactly the same structure and functions except that heat-insulating layers 33 are formed between the cast metal block 6 and the swirl chamber blocks 4 and some attendant function changes are involved. Therefore, the same component is represented by the same reference numeral and repetition of explanation will be omitted. The heat-insulating layer interposed between the cast metal block 6 and the swirl chamber block 4 can be formed by a heat-insulating material such as ceramic powder. To assemble the heat-insulating material such as ceramic powder to the molded article 9, the heat-insulating layer 33 can be formed between the molded article 9 and the swirl chamber block 4 by forming a plurality of recesses at predetermined positions on the inner peripheral surface of the molded article 9 and disposing the heat-insulating material in these recesses when the molded article 9 is molded.

The heat-insulating structure of the swirl chamber in accordance with the present invention is constituted as described above and has the following functions.

Though the ceramic material constituting the swirl chamber block 4 such as silicon nitride ($Si_3N_4$), silicon carbide (SiC), aluminum titanate, composite materials, or the like, has high heat resistance, it is weak to tensile strength. Generally, the ceramic material has compressive strength which is by about 10 times higher than tensile strength and has extremely high durability to the compressive strength. Further, the coefficient of thermal expansion of the ceramic material is lower than that of the metal material.

Accordingly, when the metal is casted to the ceramic material, the degree of shrinkage of the metal due to cooling of the molten metal is greater than that of the ceramic material and the compressive force is in advance imparted to the swirl chamber block 4 made of the ceramic material by utilizing the dimensional change resulting from the shrinkage of the metal so as to secure the strength of the swirl chamber block 4. The coefficient of thermal expansion ratio is $3.2 \times 10^{-6}$ for silicon nitride ($Si_3N_4$) as one of the ceramic materials and is about $1 \times 10^{-6}$ for aluminum titanate. In contrast, the coefficient of thermal expansion is $11 \times 10^{-6}$ for the cast iron as one of the metal materials and is $22 \times 10^{-6}$ for aluminum. Therefore, when the metal material such as Fc, Al or the like is solidified from its molten state and reaches the normal temperature, the difference of the thermal shrinkage of about 1/10 occurs between it and the ceramic material. The compressive force corresponding to this difference of thermal shrinkage occurs in the metal material and the residual compressive stress due to the metal material is imparted to the ceramic material. In other words, when the molten metal is casted to the molded article 9 positioned outside the swirl chamber block 4 made of the ceramic material, and made of the fiber-reinforced material, the compressive force occurs in the cast metal block 6 due to the difference of shrinkage at the time of cooling of the molten metal because the metal material has greater shrinkage rate than the ceramic material and the residual compressive stress is imparted to the swirl chamber block 4. The compressive force to the portion A of the jet port formation portion 17 of the swirl chamber block 4 can be made greater than that at the other portions by selecting suitably the thickness of the cast metal block formed by casting the metal and the control can be made in such a manner as to ensure the strength under the preferred state throughout the entire portions of the swirl chamber block 4.

Figure 9A:
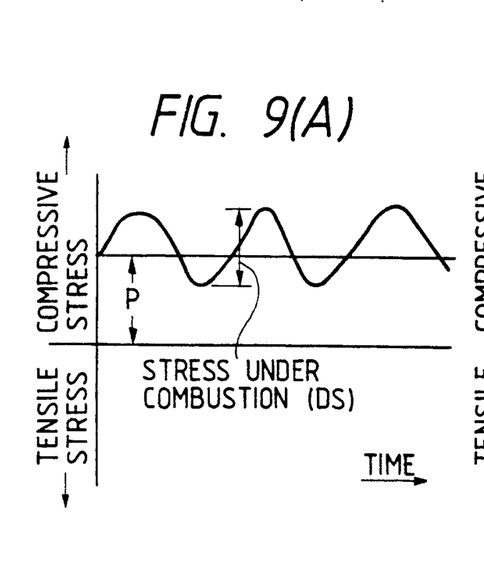
FIG. 9(A) is an explanatory view useful for explaining the acting state of the stress when the heat-insulating structure of a swirl chamber in accordance with the present invention is in use.
Figure 9B:
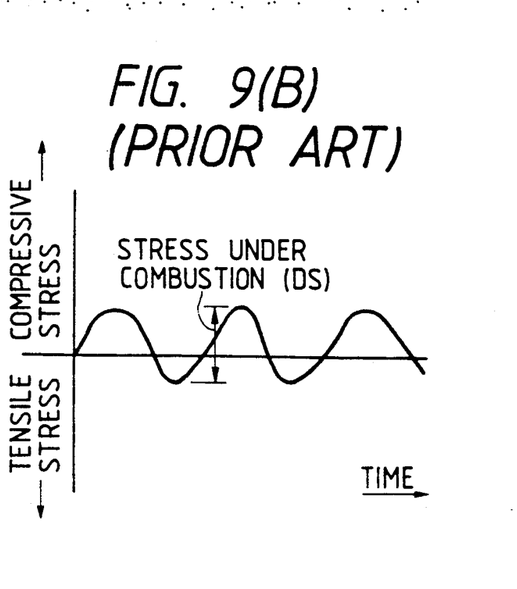
FIG. 9(B) is an explanatory view useful for explaining the acting state of the stress when a conventional heat-insulating structure of a swirl chamber is in use.

Next, an example of the compressive force and the tensile force acting on the swirl chamber block when the heat-insulating structure of the swirl chamber is mounted and used practically in the engine will be explained with reference to FIGS. 9(A) and 9(B). FIG. 9(A) shows the heat-insulating structure of the swirl chamber in accordance with this invention and FIG. 9(B) shows the heat-insulating structure of the swirl chamber in accordance with the prior art. In the drawings, the compressive force is plotted at the upper part of the ordinate, the tensile force, at the lower part, and the time, on the abscissa. As is obvious from the drawing, if the residual compressive stress P is in advance imparted to the ceramic material constituting the swirl chamber block 4 in FIG. 9(A), the swirl chamber block 4 itself is under the state where it receives the compressive force, even when the tensile force becomes excessive, due to the residual compressive stress P that is imparted in advance, even if various stresses, that is, the working stress DS of the compressive force and the tensile force, act on the swirl chamber block 4 constituting the swirl chamber 2, and damage to the swirl chamber block 4 such as cracks and breakage due to the tensile force does not occur.

In contrast, the swirl chamber block of the conventional heat-insulating structure of the swirl chamber is not provided with the cast metal block as shown in FIG. 9(B) and the residual compressive stress is not in advance imparted to it. Accordingly, various working stresses DS, that is, the compressive force and the tensile force, act directly on the swirl chamber block. Particularly, the swirl chamber block receives the tensile force directly and eventually, results in damage such as cracks and breakage.

The thermal transfer rate and coefficient of thermal expansion of the cast metal block 6 can be controlled to desired values by changing variously the content of the fiber-reinforced material such as the ceramic whiskers, the ceramic fibers, or the like, existing in the metal material of the cast metal block 6, by selecting the material of the ceramic material or by changing and adjusting the thickness, the location, and the like.

The temperature difference occurs between the swirl chamber block 4 made of the ceramic material and the cast metal block 6 but if this temperature difference is small and the temperature rises in the heat-insulating structure as a whole, the residual compressive stress sometimes drops due to the difference of the coefficients of thermal expansion described above. In this case, the function of the present invention can be made effective by use of the metal having low coefficient of thermal expansion such as Niresist as the cast metal material. These materials can be selected freely in accordance with the temperature distributions of the ceramic material and casting metal.

Furthermore, the residual compressive stress imparted to the swirl chamber block 4 of the ceramic material differs depending on the thickness of the cast metal block 6. For example, when the thickness of the cast metal block 6 is increased, a large residual compressive stress is imparted to the swirl chamber block 4. If the excessive residual compressive stress is imparted to the ceramic material, on the contrary, cracks, breakage, and the like, occur in the swirl chamber block 4. Therefore, the thickness of the casting metal is preferably selected to the optimum condition in accordance with the shapes of the swirl chamber block 4 and cast metal block 6, the compressive force, the material strength, and the like.

As described above, the heat-insulating structure of the swirl chamber in accordance with the present invention is not produced by directly casting the metal to the cylinder head 10. Accordingly, the residual compressive stress to be imparted to the swirl chamber block 4 can be controlled to a desired value. Even when the cylinder head 10 is made of either aluminum (Al) or cast iron (Fc), the casting metal to be casted into the swirl chamber 2 can be selected freely irrespective of the material of the cylinder head 10.

What is claimed is:

1. In an internal combustion engine including a cylinder block having formed therein cylinders, a cylinder head fixed to said cylinder block and equipped with hole portions formed in such a manner as to correspond to said cylinders for forming swirl chambers, and main combustion chambers formed inside said cylinders of said cylinder block, a heat-insulating structure of a swirl chamber comprising:

swirl chamber blocks having formed therein said swirl chambers and jet ports establishing communication between said swirl chambers and said main combustion chambers, and made of a ceramic material; and cast metal blocks formed by casting a metal material into gaps in molded articles made of a fiber-reinforced material and disposed outside said swirl chamber blocks, said cast metal blocks being fixed to said hole portions formed in said cylinder head.

2. A heat-insulating structure of a swirl chamber according to claim 1, wherein said ceramic material forming said swirl chamber block is silicon nitride.

3. A heat-insulating structure of a swirl chamber according to claim 1, wherein said ceramic material forming said swirl chamber block is silicon carbide.

4. A heat-insulating structure of a swirl chamber according to claim 1, wherein said molded article is molded from a ceramic material such as ceramic whiskers, ceramic fibers, or the like.

5. A heat-insulating structure of a swirl chamber according to claim 1, wherein said molded article is molded from stainless steel fibers.

6. A heat-insulating structure of a swirl chamber according to claim 4, wherein an air layer is formed between the outer surface of said cast metal block and said hole portion of said cylinder head.

7. A heat-insulating structure of a swirl chamber according to claim 1, wherein the inlet portion of said hole portion formed in said cylinder head is formed in a large size, and said cast metal block is fixed to said hole portion of said cylinder head by fitting the flange portion disposed in said cast metal block to said inlet portion.

8. A heat-insulating structure of a swirl chamber according to claim 1, wherein the contact area and contact position between the outer surface of said cast metal block and said hole portion formed in said cylinder head are set in such a manner that the temperature distribution of said swirl chamber block becomes uniform.

9. A heat-insulating structure of a swirl chamber according to claim 1, wherein compressive force is imparted to said swirl chamber block by casting and disposing said cast metal block outside said swirl chamber block.

10. In an internal combustion engine including a cylinder block having formed therein cylinders, a cylinder head fixed to said cylinder block and equipped with hole portions formed in such a manner as to correspond to said cylinders for forming swirl chambers, and main combustion chambers formed inside said cylinders of said cylinder block, a heat-insulating structure of a swirl chamber comprising:

swirl chamber blocks having formed therein said swirl chambers and jet ports establishing communication between said swirl chambers and said main combustion chambers, and made of a ceramic material;

cast metal blocks formed by casting a metal material into gaps in molded articles made of a fiber-reinforced material and disposed outside each of said swirl chambers, said cast metal blocks being fixed to said hole portions formed in said cylinder head, with air layers formed between said cast metal blocks and said hole portions formed in said cylinder head; and heat-insulating layers disposed between said swirl chamber blocks and said cast metal blocks.

11. A production method of a heat-insulating structure of a swirl chamber comprising the steps of:

forming swirl chamber blocks equipped with swirl chambers, jet ports for establishing communication between said swirl chambers and said main combustion chambers and fitting holes for receiving fuel injection nozzles therethrough, from a ceramic material;

disposing a molded article made of a fiber-reinforced material and having gaps outside each of said swirl chamber blocks;

packing casting sand into the portions for forming said swirl chambers, said jet ports and said fitting holes formed in said swirl chamber blocks;

disposing said swirl chamber blocks having packed thereinto said casting sand and encompassed by said molded articles into casting molds having gates;

pouring molten metal via said gates so as to pack said molten metal material into said gaps of said molded articles;

forming cast metal blocks;

cooling and solidifying said molten metal material packed into said gaps of said molded articles so as to form said molded articles in said cast metal blocks; and fitting and fixing said cast metal blocks into said hole portions formed in said cylinder head.

12. A heat-insulating structure of a swirl chamber according to claim 11, wherein fitting and fixing of said cast metal blocks into said hole portions formed in said cylinder head can be accomplished by pushing the flange portion formed in each of said cast metal blocks into the inlet portion of each of said hole portions.

13. A production method of a heat-insulating structure of a swirl chamber according to claim 11, wherein the gas generated from said casting sand packed into said swirl chamber block during the step of casting said molten metal material to the outside of said swirl chamber block is vented to the outside.

14. A production method of a heat-insulating structure of a swirl chamber according to claim 11, wherein the metal material constituting said cast metal block is selected from the group consisting of aluminum, cast iron and Niresist.

* * * * *